UNITED STATES PATENT OFFICE.

HANS VON STROMBECK, OF NEW YORK, N. Y.

PROCESS OF PURIFYING AMMONIA.

SPECIFICATION forming part of Letters Patent No. 477,089, dated June 14, 1892.

Application filed November 9, 1891. Serial No. 411,378. (No specimens.)

*To all whom it may concern:*

Be it known that I, HANS VON STROMBECK, a citizen of the German Empire, residing at New York, in the county and State of New York, have invented new and useful Improvements in Processes of Purifying Ammonia, of which the following is a specification.

The object of this invention is to produce liquid ammonia of a higher grade of purity than that which is produced by the processes used at the present time.

Ammonia-gas is usually prepared of two different raw materials: first, of sulphate of ammonia, and, second, of aqueous ammonia, which is obtained as a by-product in the manufacture of illuminating-gas. If ammonia-gas made in this way is liquefied and the liquid ammonia is allowed to evaporate, a yellow fluid of peculiar penetrating odor and basic reaction is left in the bottle. Beside this yellow fluid other impurities are present in this liquid ammonia, such as moisture and mineral oil.

Careful analysis has given the following result:

| | |
|---|---:|
| Ammonia | 98.9863 |
| Moisture | 0.1072 |
| Yellow fluid | 0.8990 |
| Mineral oil | 0.0075 |
| Total | 100.0000 |

The yellow fluid consists, chiefly, of methylic alcohol, ($CH_3OH$,) ethylic alcohol, ($C_2H_5OH$,) and isopropylic alcohol, ($CH_3.CHOH.CH_3$.)

In order to purify the ammonia-gas prepared as above described and to free the same from the impurities above named before it is liquefied, I bring the crude ammonia-gas in contact with metallic sodium, which may be done by passing the same through a vessel containing trays on which comminuted metallic sodium is spread, and by the action of the sodium the alcoholic bodies above named, which form the greatest portion of the impurities, are transformed into sodium alcoholates as follows:

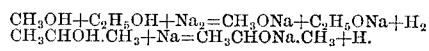

$$CH_3OH + C_2H_5OH + Na_2 = CH_3ONa + C_2H_5ONa + H_2$$
$$CH_3CHOH.CH_3 + Na = CH_3CHONa.CH_3 + H.$$

These sodium alcoholates, being non-volatile, remain in the vessel containing the sodium, while the purified ammonia-gas escapes from said vessel and is liquefied in the usual way. By removing these impurities the cooling effect of the ammonia is improved.

What I claim as new, and desire to secure by Letters Patent, is—

The within-described process of purifying ammonia, which consists in exposing the crude ammonia-gas to the action of metallic sodium, then separating the purified gas from the impurities, and finally liquefying the gas, substantially as described.

In testimony whereof I have hereunto set my hand in the presence of two subscribing witnesses.

HANS VON STROMBECK.

Witnesses:
WM. C. HAUFF,
W. HAUFF.